2 Sheets—Sheet 1.

A. E. WENZEL.
Bee-Hive.

No. 202,612. Patented April 16, 1878.

Witnesses:
J. C. Dietrich.

Inventor:
Adolphus E. Wenzel.
Per C. H. Watson & Co. Attorneys.

N. PETERS, PHOTO-LITHOGRAPHER, WASHINGTON, D. C.

2 Sheets—Sheet 2.
A. E. WENZEL.
Bee-Hive.
No. 202,612. Patented April 16, 1878.
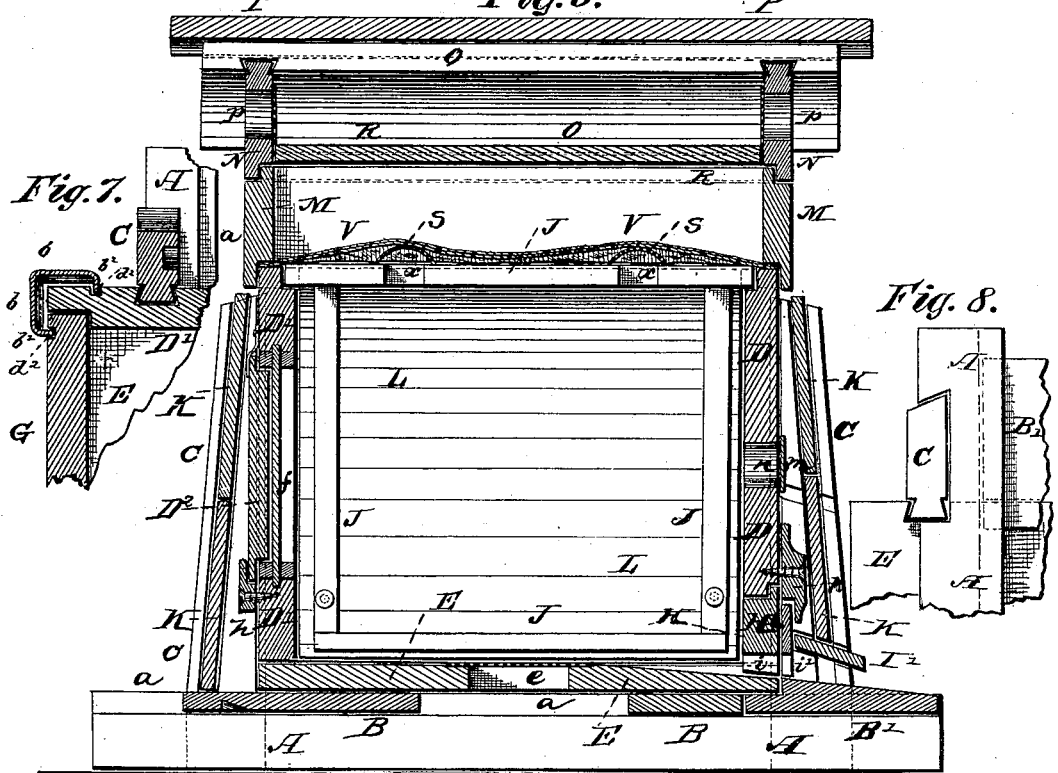
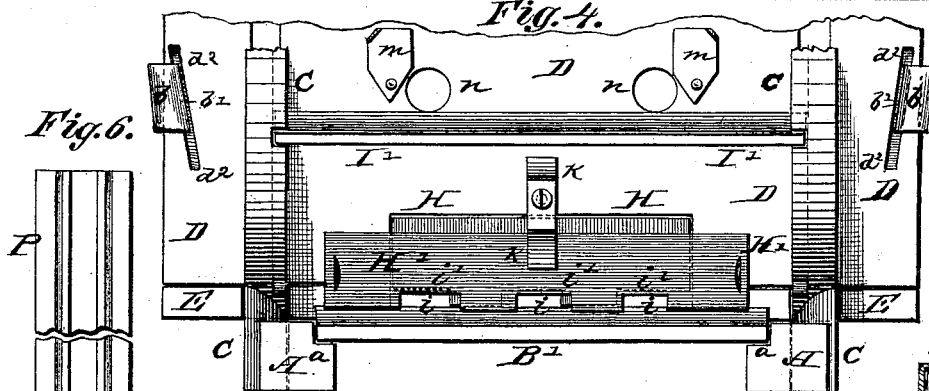
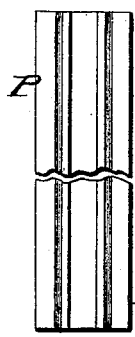
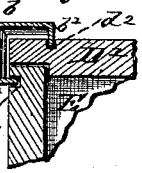
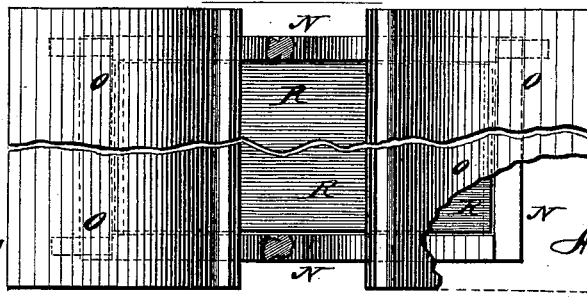
Witnesses:
P. C. Dietrich.
Frank H. Duffy
Inventor:
Adolphus E. Wenzel.
per C. H. Watson & Co., Attorneys.

UNITED STATES PATENT OFFICE.

ADOLPHUS E. WENZEL, OF CALLICOON, NEW YORK.

IMPROVEMENT IN BEE-HIVES.

Specification forming part of Letters Patent No. 202,612, dated April 16, 1878; application filed September 21, 1877.

*To all whom it may concern:*

Be it known that I, ADOLPHUS E. WENZEL, of Callicoon, in the county of Sullivan and State of New York, have invented certain new and useful Improvements in Bee-Hives; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to bee-hives, having for its object to form an improved hive; and it consists in providing the sides of the hive near the corners with inclined slots and angle-irons, whereby the hive may be drawn together and held firmly in place, and providing the hive with flexible angular pockets, arranged within the hive, and in combining with the hive supplemental boards and posts and the angular pockets, whereby a winter hive is formed, as will be hereinafter more fully described.

Figure 1:
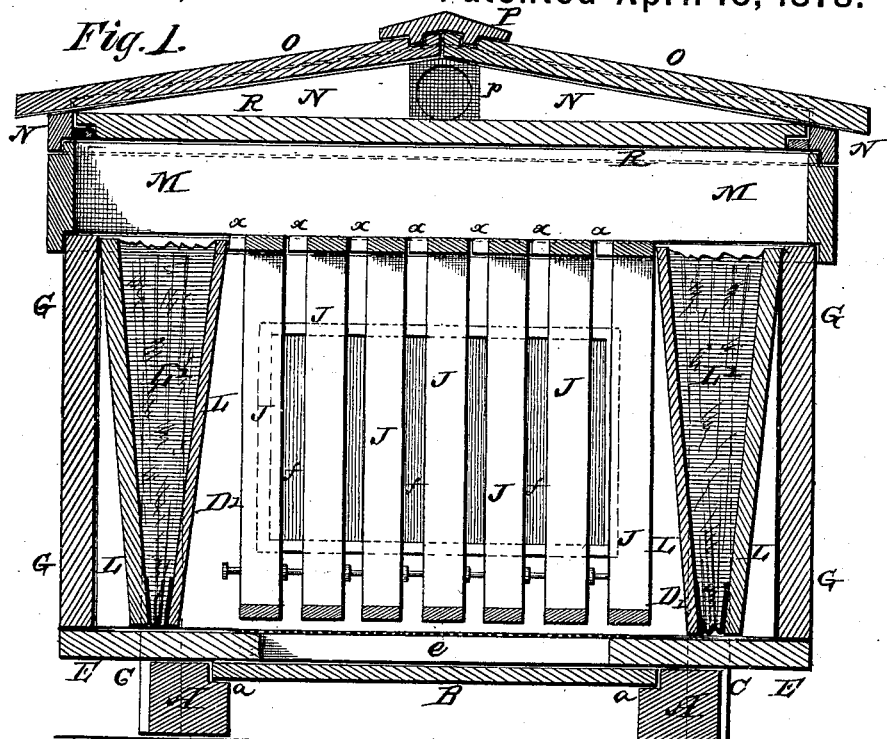
Figure 2:
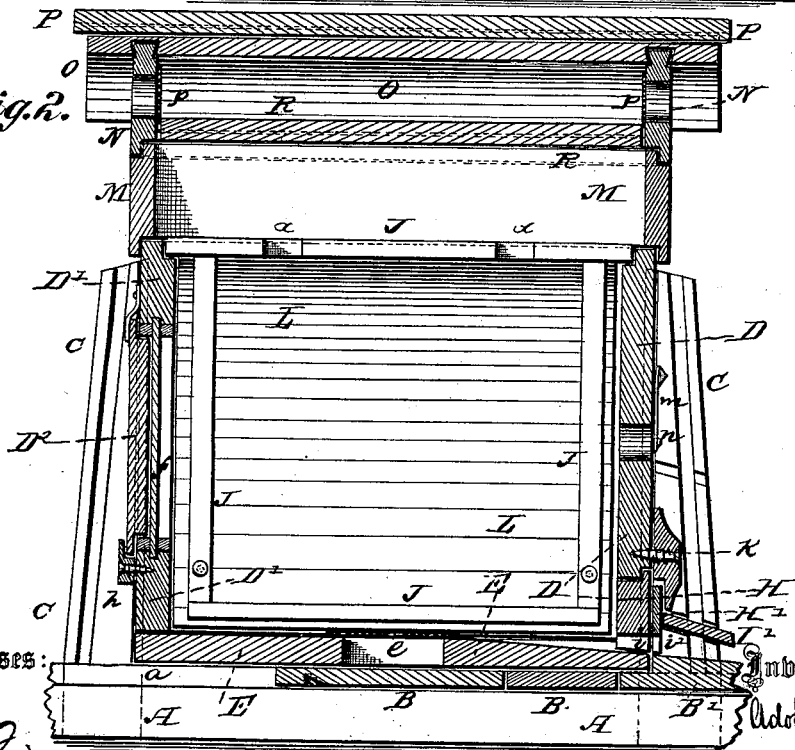

In the annexed drawings, to which reference is made, and which fully illustrate my invention, Figure 1 is a central vertical section. Fig. 2 is a transverse section as a summer hive. Fig. 3 is a similar view when used as a winter hive. Fig. 4 is a portion of an elevation of the front. Fig. 5 is a plan view of the roof, partly broken away; and Figs. 6, 7, 8, and 9 are various detail views of my invention.

A A represent two parallel bed-sills, formed on their inner sides each with a longitudinal rabbet, $a$, upon which are placed sliding boards B. Each sill A is also, at a suitable distance from each end, on the outside, provided with a dovetailed groove for the insertion of the lower end of a standard, C, said portion of the standard being correspondingly dovetailed. D and $D^1$ are, respectively, the front and back of the hive, which are, on their outer sides, near the end, provided with vertical dovetailed grooves for said front and back to slide downward upon the correspondingly-shaped inner edges of the standards C C. The front and back D $D^1$ rest upon the bottom E, which lies upon the sills A A, and has notches in its sides to fit on the standards and be kept in place thereby.

The front and back D $D^1$ are rabbeted at the ends and top, as shown, and the end pieces G G are placed upon the bottom E against the rabbets at the ends of the front and back. These end pieces are held in place by means of exterior angular catches $b$ $b$, made in L shape, and having along each side an inwardly-projecting flange, $b^1$, which engages with the inclined slots formed near the corners of the hive, as shown at $b^2$. The slots being inclined, the parts of the hive are drawn together as the angle-irons are drawn down.

In the bottom E of the hive is a ventilating-opening, $e$, covered with wire-cloth or other suitable equivalent material. In the back $D^1$ is an opening covered with glass $f$, and on the outside is a hinged door, $D^2$, fastened by a button, $h$. By opening this door the bee-keeper can readily see the progress of the work in the hive without disturbing the bees.

In the front D of the hive, at the bottom, is a large opening, closed by a door, H, which is held in place by a reversible button, $k$, said door having suitable bee-entrances $i$ $i$ formed in its lower edge. The door H is only to be removed for cleaning out the hive, the bottom being made sloping from the center toward the door, as shown.

$H'$ is a slide, placed, when required, in front of and against the door H, said slide having openings $i'$ in its lower edge, so that by moving the slide laterally the bee-entrances $i$ can be regulated at will, or closed altogether, as desired. This slide, when thus in position, is held in place by one end of the reversible button $k$, and rests upon the alighting-board $B'$, which rests on the rabbets $a$ in the sills A at that side of the hive. This alighting-board has a shoulder or offset along its inner side, so as to form a tongue, that passes under the bottom E and against one of the boards B. The other board B can be drawn out from the back, so as to uncover the ventilating-opening $e$, or moved inward, so as to close the same.

When the slide $H'$ is not to be used the button $k$ is reversed, and the slide may be held above the button by its then upper end, while the lower end of the button holds the door H in its place.

Above the bee-entrances is an outside strip, $I'$, placed in inclined grooves in the front standards $c$ $c$, as shown, thus forming a covered passage over the alighting-board to the bee-entrances.

About midway between the top and bottom of the hive, in the front D, are entrances n n, provided with slides m m, which ordinarily are closed. When, however, it is desirable that the bees should enter at this point instead of at the bottom, these slides are opened, the strips I' placed in other grooves in the front standards c to form the alighting-board at this point, and the bottom bee-entrances are closed by means of the slide H', it being, of course, understood that this slide is reversed to completely close said entrances i.

In winter-time boards K K are let down into grooves in both the front and rear standards, with a small board below them, to form an additional protection or double wall at the front and rear of the hive, and the space filled with sawdust or other non-conducting material.

J J are the comb-frames, constructed in the ordinary manner, and supported on the rabbets in the upper edges of the front and back D D' of the hive, the top bars of the frames having suitable openings x for the passage of the bees.

At each end, inside of the hive, is placed a pocket, composed of two boards, L L, connected together at the bottom and sides by canvas L', in such manner that the two boards or sides L L can be closed together, and when opened their lower ends will be closer together than the top, more or less. In summer-time these pockets are closed; but in the winter-time they are opened and filled with sawdust, or other suitable non-conducting material, for retaining the heat in the hive.

In summer-time one or more rabbeted box-frames, M, are placed over and fitted to the hive thus constructed, said frame or frames to contain honey-boxes or honey-frames of any suitable or desired construction. On top of such frames is placed and fitted a rabbeted roof-frame, N, having ventilators p p in front and rear, as shown. The front and rear pieces of this frame N are higher in the center and incline downward toward both sides, and their upper edges form dovetailed tenons, so to speak, upon which are slid the two sides O O of the roof. These two sides come together at the peak of the roof, and have along their upper edges dovetailed grooves, into which are passed corresponding tongues on the under side of the cap P, which covers the joint.

In the winter-time the frames M are not used, or, at least, only one shallow frame, upon which the roof-frame N is placed. In this roof-frame is then fitted a board, R, rabbeted at its ends, and resting upon rabbets in the end pieces of said roof-frame.

Over the openings x in the comb-frames are laid two concave pieces, S, of wire-cloth, which admit of the bees passing from one part of the hive to the other, and the whole is covered by a pad, V.

It will thus be seen that in my hive every provision is made to maintain a uniform temperature in the summer, as well as a uniform winter temperature.

By means of the pockets at the sides of the hive the frames can be handled from either side, and separated laterally before lifting any of them upward, which is of great importance in the preservation of the comb-frames.

One of the most important features of my invention, however, rests in the fact that no nails, screws, or similar means are employed in the construction of my hive. All the parts are fitted and united together by dovetail grooves and tongues, or their equivalents, in such manner that the entire hive can be easily and quickly taken to pieces, or knocked down, to be packed in small compass for shipment, and equally easily be put together again at the destination.

In the construction of the roof it will be seen that any shrinkage of the roof-plates O O does in no way injure the hive or open any joints.

In summer-time I also use the boards K at the back, to protect the body of the hive from the sun's rays.

Having thus fully described my invention, what I claim as new, and desire to secure by Letters Patent, is—

1. In a bee-hive, the combination of the sides, having inclined slats $b^2$, and the angle-irons b, substantially as and for the purpose set forth.

2. In a bee-hive, a flexible angular pocket, L L', arranged within the hive, substantially as and for the purpose set forth.

3. In combination with a bee-hive, the supplementary sides K K, supported by posts C, and the flexible pockets L L', substantially as and for the purpose set forth.

4. As an improvement in bee-hives, the system of joints of the external walls or inclosure, herein described and represented, by which alone the several parts are firmly interlocked and held together, yet so, nevertheless, as to be easily and without injury taken apart and reunited, as occasion may demand, substantially as specified.

In testimony that I claim the foregoing as my own I have hereto affixed my signature in presence of two witnesses.

ADOLPHUS E. WENZEL.

Witnesses:
P. TRAYNOR,
W. F. TRAYNOR.